(12) United States Patent
Chung

(10) Patent No.: US 7,069,020 B2
(45) Date of Patent: Jun. 27, 2006

(54) AUTOMATIC TIME SETTING METHOD OF ASYNCHRONOUS MOBILE COMMUNICATION TERMINAL

(75) Inventor: In-Bok Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 10/278,295

(22) Filed: Oct. 23, 2002

(65) Prior Publication Data

US 2003/0083077 A1    May 1, 2003

(30) Foreign Application Priority Data

Oct. 26, 2001    (KR)    ...................... 10-2001-0066334

(51) Int. Cl.
*H04Q 7/20*    (2006.01)
(52) U.S. Cl. .............................. 455/456.1; 455/404.2; 455/456.3; 455/456.6; 455/432.1; 455/456.2
(58) Field of Classification Search ............ 455/435.1, 455/435.2, 456.1–456.3, 566, 404.2, 432.1, 455/432.2; 368/47, 84, 21
See application file for complete search history.

(56) References Cited

U.S. PATENT DOCUMENTS

| | | | | |
|---|---|---|---|---|
| 5,077,706 | A | * | 12/1991 | Ganter ........................ 368/47 |
| 5,089,814 | A | | 2/1992 | DeLuca et al. ........ 340/825.49 |
| 5,309,500 | A | | 5/1994 | Koma et al. ................... 379/58 |
| 5,628,061 | A | * | 5/1997 | Shirakawa ................ 455/186.1 |
| 5,768,697 | A | * | 6/1998 | Shirakawa ................ 455/181.1 |
| 6,192,007 | B1 | * | 2/2001 | Aoshima ..................... 368/10 |
| 6,356,761 | B1 | * | 3/2002 | Huttunen et al. ........ 455/456.1 |
| 6,356,763 | B1 | * | 3/2002 | Kangas et al. ........... 455/456.1 |

(Continued)

FOREIGN PATENT DOCUMENTS

CN    1289502 A    3/2001

(Continued)

OTHER PUBLICATIONS

3GPP TS 23,003 V3.7.0, (Dec. 2000) Technical Specification XP-002259265 3$^{rd}$ Generation Partnership Project; Technical Specification Group Core Network; Numbering, addressing and identification (Release 1999) pp. 47, 62, 65, 99 and 100, no month listed.

*Primary Examiner*—Sonny Trinh
*Assistant Examiner*—Huy Phan
(74) *Attorney, Agent, or Firm*—Lee, Hong, Degerman, Kang & Schmadeka

(57) ABSTRACT

In an automatic time setting method of an asynchronous mobile communication terminal, when a user moves from a first area to a second area in a GSM/GPRS network, a time difference between the two areas is calculated by using LAIs or RAIs of the first and second areas, and a time of the terminal is reset according to the calculated time difference. The asynchronous mobile communication terminal includes a RTC (real time clock) circuit for generating time information; a memory for storing time difference information between areas; and a CPU for reading a time difference corresponding to area information of a first and a second areas from the memory when a user moves from the first area to the second area and controlling the RTC circuit.

15 Claims, 3 Drawing Sheets

U.S. PATENT DOCUMENTS

| | | | |
|---|---|---|---|
| 6,470,136 B1 * | 10/2002 | Kohashi | 386/83 |
| 6,526,039 B1 * | 2/2003 | Dahlman et al. | 370/350 |
| 6,636,742 B1 * | 10/2003 | Torkki et al. | 455/456.1 |
| 6,751,483 B1 * | 6/2004 | Oh | 455/566 |
| 6,792,270 B1 * | 9/2004 | Neumann | 455/432.1 |
| 2001/0027108 A1 * | 10/2001 | Sumino | 455/456 |
| 2002/0006805 A1 * | 1/2002 | New et al. | 455/525 |
| 2002/0136094 A1 * | 9/2002 | Kawai | 368/47 |
| 2002/0181333 A1 * | 12/2002 | Ito et al. | 368/21 |
| 2003/0007470 A1 * | 1/2003 | Grilli et al. | 370/335 |
| 2003/0013494 A1 * | 1/2003 | Imura | 455/566 |

FOREIGN PATENT DOCUMENTS

| | | |
|---|---|---|
| DE | 198 04 188 A1 | 5/1999 |
| JP | 06-013977 | 1/1994 |
| JP | 07-079194 | 3/1995 |
| JP | 10-160870 | 6/1998 |
| JP | 2001-197169 | 7/2001 |
| JP | 2001-337182 | 12/2001 |
| WO | WO 90/13983 | 11/1990 |

* cited by examiner

| OLD LOCATION INFORMATION | | | | NEW LOCATION INFORMATION | | | | TIME DIFFERENCE |
|---|---|---|---|---|---|---|---|---|
| MCC | MNC | LAC | RAC | MCC | MNC | LAC | RAC | |
| | | | | | | | | +10 |
| ⋮ | ⋮ | ⋮ | ⋮ | ⋮ | ⋮ | ⋮ | ⋮ | ⋮ |
| | | | | | | | | −10 |

| SUMMER TIME | OLD LOCATION INFORMATION | | | | NEW LOCATION INFORMATION | | | | TIME DIFFERENCE |
|---|---|---|---|---|---|---|---|---|---|
| | MCC | MNC | LAC | RAC | MCC | MNC | LAC | RAC | |
| NO | | | | | | | | | +10 |
| YES | | | | | | | | | |
| | ⋮ | ⋮ | ⋮ | ⋮ | ⋮ | ⋮ | ⋮ | ⋮ | ⋮ |
| | | | | | | | | | −10 |

AUTOMATIC TIME SETTING METHOD OF ASYNCHRONOUS MOBILE COMMUNICATION TERMINAL

BACKGROUND OF THE INVENTION

1. Field of the Invention

The present invention relates to a mobile communication terminal, and in particular to an automatic time setting method of an asynchronous mobile communication terminal.

2. Description of the Prior Art

In general, a synchronous mobile communication terminal operated in a CDMA (code division multiple access) network receives time information from a base station. On the contrary, an asynchronous mobile communication terminal (hereinafter, it is referred to as a terminal) operated in a GSM (global system for mobile communication) network and a GPRS (general packet radio service) network not only receives time information from a base station but also generates time information by using a RTC (real time clock) circuit disposed therein.

In more detail, in the terminal operated in the GSM/GPRS network, the RTC circuit counts a low frequency clock signal (32.768 KHz) and generates time information (second, minute, hour), and a CPU is synchronized with a high frequency clock signal (13 MHz) and displays time information generated in the RTC circuit on a LCD.

However, when a user travels a large number of countries operating the GSM/GPRS network, a time difference may occur between countries or cities. In that case, the user has to calculate a time difference between a previous area and a present area and input a present time manually by using a time setting menu of the terminal.

For example, when the user moves from Berlin (Germany) to London (England), the user has to calculate a time difference (−1) between Berlin and London and reset a present time (from a Berlin time to a London time) of the terminal by using a time setting menu of the terminal.

As described above, when the terminal user moves from a first area to a second area in the GSM/GPRS network, in the conventional art, because the user has to calculate personally a time difference between two areas and reset a time of the terminal in every case, it is intricate.

SUMMARY OF THE INVENTION

In order to solve the above-mentioned problem, it is an object of the present invention to provide a time setting method of an asynchronous mobile communication terminal which is capable of setting a time automatically in a GSM/GPRS network.

In order to achieve the above-mentioned object, in the GSM/GPRS network, an asynchronous mobile communication terminal in accordance with the present invention includes a RTC (real time clock) circuit for generating time information; a memory for storing time difference information between areas; and a CPU for reading a time difference corresponding to area information of a first area and a second area from the memory when a user moves from the first area to the second area and controlling the RTC circuit.

In order to achieve the above-mentioned object, in the GSM/GPRS network, an asynchronous mobile communication terminal in accordance with the present invention includes a RTC (real time clock) circuit for generating time information; a time difference table for storing time difference information between areas; a CPU for reading a time difference corresponding to a LAI (location area identification) or a RAI (routing area identification) of a first area and a second area from the time table when a user moves from the first area to the second area in a certain network and controlling the RTC circuit; and a LCD for displaying the time information generated by the RTC circuit.

In order to achieve the above-mentioned object, in the GSM/GPRS network, a time setting method of an asynchronous mobile communication terminal in accordance with the present invention includes requesting area information of a second area to a base station when a user moves from a first area to the second area in an asynchronous network; storing the area information of the second area provided from the base station in a time difference table; reading a time difference corresponding to the area information of the first and second areas from the time difference table; and resetting a time of the terminal by using the read time difference.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of the present invention will be described.

In a GSM (global system for mobile communication) network, when a user moves from a first area to a second area, a time of an asynchronous mobile communication terminal is automatically reset by using a LAI (location area identification) of the first area and a LAI of the second area.

In addition, in a GPRS (general packet radio system), when the user moves from a first area to a second area, a time of an asynchronous mobile communication terminal is automatically reset by using a RAI (routing area identification) of the first area and a RAI of the second area. Herein, a time difference according to a LAI value and a RAI value is stored in a time difference table of the terminal.

Figures 1, 2:
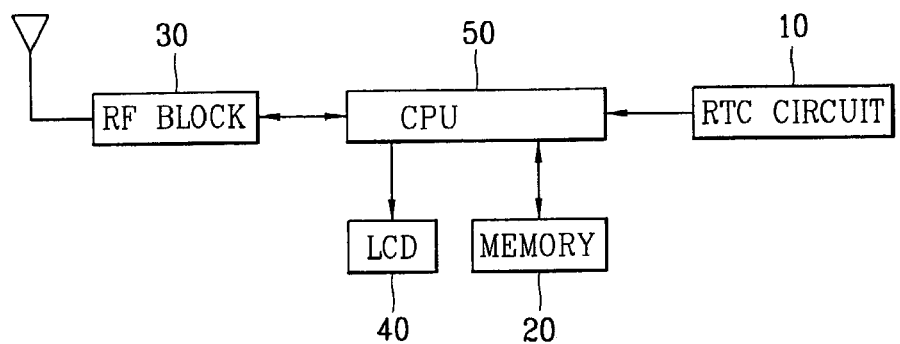
FIG. 1 is a block diagram illustrating an asynchronous mobile communication terminal in accordance with the present invention.
FIG. 2 is a first embodiment of a time difference table stored in a memory of the terminal in FIG. 1.
Figure 3:
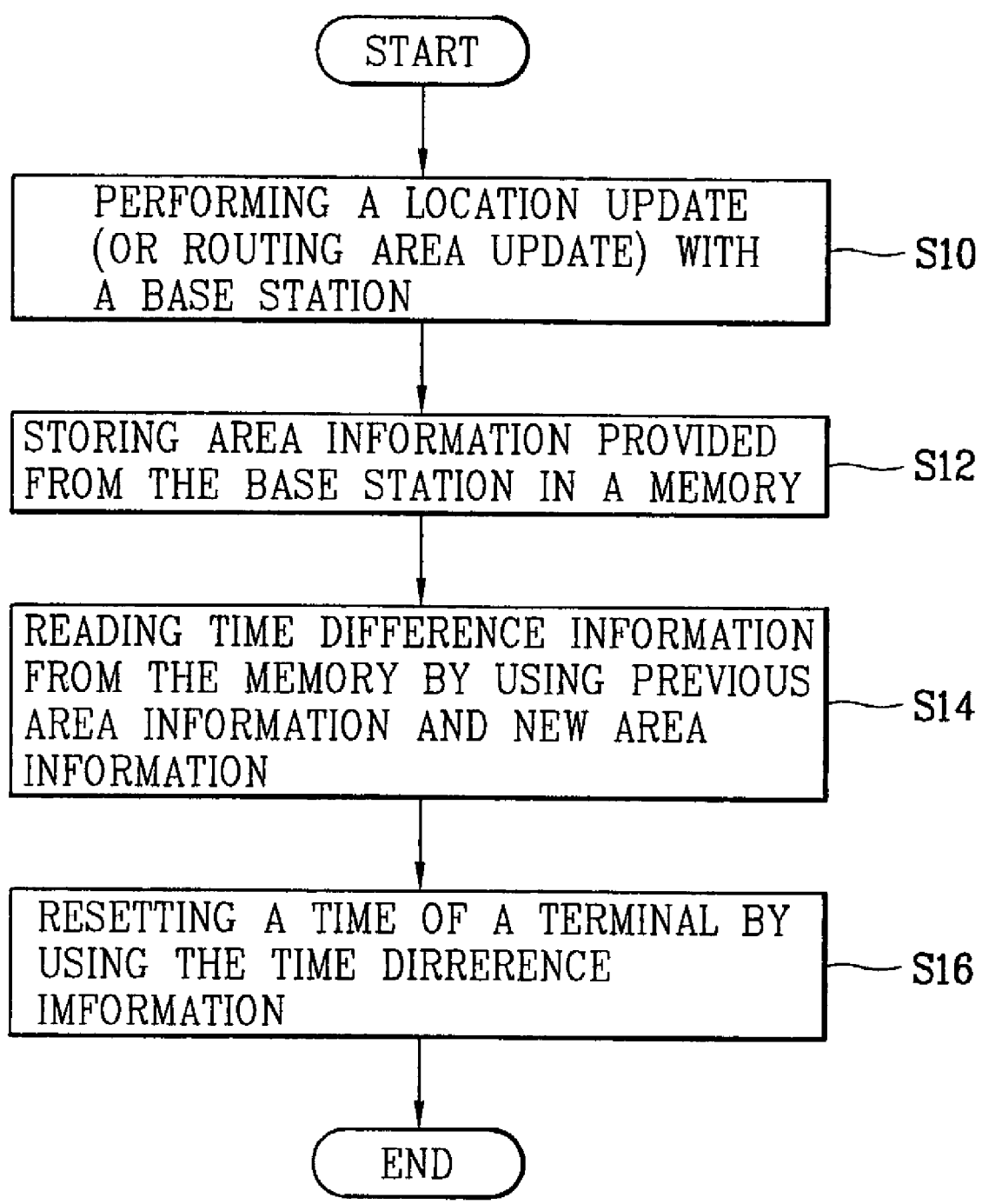
FIG. 3 is a flow chart illustrating an automatic time setting method of the terminal in FIG. 1 in a GSM/GPRS network.

FIG. 1 is a schematic view illustrating a terminal operated in the GSM/GPRS network in accordance with the present invention.

As depicted in FIG. 1, the terminal in accordance with the present invention includes a RTC circuit 10 for counting a low frequency clock signal of 32.768 KHz and generating time information (second, minute, hour); a memory 20 for storing time difference information of areas; and a CPU 50 for reading the time difference stored in the memory 20 on the basis of LAI (or RAI) information provided from a base station through a RF processing block 30, controlling the RTC circuit 10 and displaying time information generated in the RTC circuit 10 on a LCD 40.

The memory 20 includes a time difference table, as depicted in FIG. 2, the time difference table includes first area (previous) information, second area (new) information, time difference information about the first and second area information and summer time information.

In addition, the first and second area information respectively includes a MCC (mobile country code), a MNC (mobile network code), a LAC (location area code) and a RAC (routing area code). Herein, LAI information includes the MCC, the MNC and the LAC, and RAI information includes the MCC, the MNC and the RAC.

The time operation of the GSM terminal in accordance with the present invention will be described with reference to accompanying drawings.

When the user locates in the first area, the RTC circuit 10 counts a low frequency clock signal of 32.768 KHz outputted from a crystal oscillator (not shown) and generates time information (second, minute, hour), and the CPU 50 displays the time information provided from the RTC circuit 10 on the LCD 40.

In addition, in a cycle (periodically) or in an area change, etc., a certain requirements of the terminal/network are satisfied, the terminal requests a location update or a routing area update to the base station. The base station transmits the requested update location information or update routing area information to the pertinent terminal.

In more detail, when the user located in the first area moves to the second area, the terminal performs location update or routing area update with the base station and receives new location information, namely, a LAI value or a RAI value through the RF block 30, and the CPU 50 stores the received LAI value or RAI value in the time difference table of the memory 20 as shown at steps S10 and S12

When the location update or the routing area update is finished, the CPU 50 reads the time difference information corresponding to the LAI or the RAI of the first and second areas from the time difference table and resets a time of the terminal by using pertinent time difference information as shown at step S16.

Figures 4, 5:
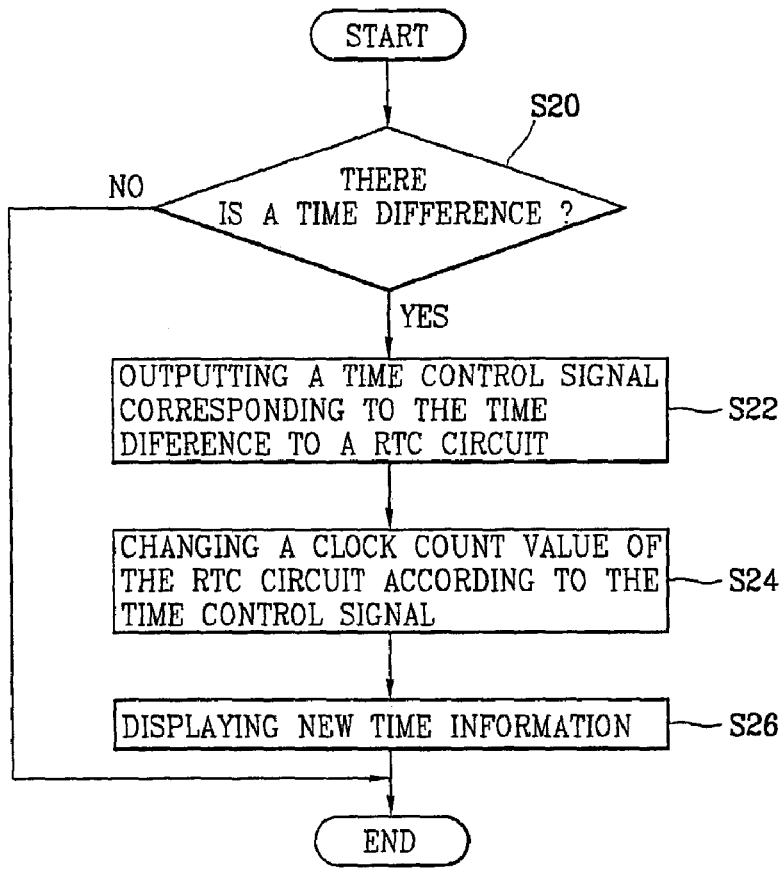
FIG. 4 is a flow chart illustrating a time resetting process in FIG. 3.
FIG. 5 is a second embodiment of a time difference table stored in the memory of the terminal in FIG. 1.

In more detail, as depicted in FIG. 4, the CPU 50 checks whether there is a time difference between the first and second areas as shown at step S20, when there is the time difference, the CPU 50 outputs a time control signal corresponding to the read time information to the RTC circuit 10 as shown at step S22, and the RTC circuit 10 updates a count value of the low frequency clock signal according to the time control signal outputted from the CPU 50 and newly generates time information (second, minute, hour.) as shown at step S24.

Accordingly, the CPU 50 displays the time information newly generated in the RTC circuit 10 on the LCD 40 as shown at step S26, in the GSM/GPRS network, although the user of the terminal moves to an area at which there is a time difference, a time of the terminal can be automatically reset.

And, as depicted in FIG. 5, as well as LAI and RAI information, summer time information can be additionally included in the time difference table and be used in the time resetting operation. In that case, the CPU 50 outputs a time control signal on the basis of a time difference by LAI, RAI and summer time information.

As described above, in the present invention, when the user moves from the first area to the second area, a time of the terminal is automatically reset by using LAI (or RAI) information of the first and second areas.

Accordingly, in the GSM/GPRS network not transmitting time information from the base station, when the user travels a large number of countries or cities, a time of the terminal is automatically reset.

And, in the present invention, by using a LAI/RAI value in time resetting of the terminal, side effect and overhead in a time change are smaller than those of the conventional method of modifying base station system information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An asynchronous mobile communication terminal, comprising:
   a real time clock circuit for generating time information;
   a memory for storing a time difference table including time difference information between areas; and
   a central processing unit for reading a time difference from the time difference table when a user of the terminal moves from a first area to a second area and controlling the real time clock circuit;
   wherein the time difference table comprises a first columnar portion for storing area information for various first areas, a second columnar portion for storing area information for various second areas, and a third columnar portion for storing time differences between respective pairs of first and second areas, wherein the area information for the various first and second areas are received from various base stations corresponding to the first or second areas;
   wherein the central processing unit reads a time difference for a pair of first and second areas by referring to the area information for the pair as stored in the first and second columnar portions.

2. The terminal of claim 1, further comprising:
   a LCD for displaying time information of the real time clock circuit.

3. The terminal of claim 1, wherein the time difference table further comprises a fourth columnar portion storing summer time information.

4. The terminal of claim 1, wherein the area information is LAI (location area identification) provided from a base station.

5. The terminal of claim 4, wherein the LAI comprises:
   a MCC (mobile country code);
   a MNC (mobile network code); and
   a LAC (location area code).

6. The terminal of claim 1, wherein the area information is RAI (routing area identification) provided from a base station.

7. The terminal of claim 6, wherein the RAI comprises:
   a MCC (mobile country code);
   a MNC (mobile network code);
   a LAC (location area code); and
   a RAC (routing area code).

8. A time setting method of an asynchronous mobile communication terminal, comprising:
   requesting area information of a second area to a base station when a user of the terminal moves from a first area to the second area in an asynchronous network;

storing the area information of the second area provided from the base station in a time difference table;

reading a time difference between the first and second areas from the time difference table; and resetting a time of the terminal by using the read time difference;

wherein the time difference table comprises a first columnar portion for storing area information for various first areas, a second columnar portion for storing area information for various second areas, and a third columnar portion for storing time differences between respective pairs of first and second areas;

wherein the method further comprises reading a time difference for a pair of first and second areas by referring to the area information for the pair as stored in the first and second columnar portions.

9. The method of claim 8, wherein the certain network is a GSM network or a GPRS network.

10. The method of claim 8, wherein the resetting step comprises the sub-steps of:

checking whether there is a time difference;

outputting a time control signal corresponding to a pertinent time difference to a real time clock-circuit when there is the time difference;

generating time information newly by changing a clock count value of the real time clock circuit according to the time control signal; and displaying the newly generated time information.

11. The method of claim 8, wherein the time difference table further comprises a fourth columnar portion storing summer time information.

12. The method of claim 8, wherein the area information is LAI (location area identification).

13. The method of claim 12, wherein the LAI comprises:

a MCC (mobile country code);

a MNC (mobile network code); and a LAC (location area code).

14. The method of claim 8, wherein the area information is RAI (routing area identification).

15. The method of claim 14, wherein the RAI comprises:

a MCC (mobile country code);

a MNC (mobile network code);

a LAC (location area code); and a RAC (routing area code).

* * * * *